United States Patent [19]

Kleeb et al.

[11] Patent Number: 4,514,531

[45] Date of Patent: Apr. 30, 1985

[54] MONOLITHIC REFRACTORIES COMPRISING A HYDROCOLLOID

[75] Inventors: Thomas R. Kleeb; Linda L. Kleeb, both of Pittsburgh, Pa.

[73] Assignee: Dresser Industries, Inc., Dallas, Tex.

[21] Appl. No.: 540,241

[22] Filed: Oct. 11, 1983

[51] Int. Cl.$^3$ .................... C04B 35/80; C04B 35/78; C08K 3/34; C08K 7/26

[52] U.S. Cl. ........................................ 524/5; 501/82; 501/95; 501/124; 501/127; 524/218; 524/555

[58] Field of Search ............................ 524/5, 555, 218; 501/82, 95, 124, 127

[56] References Cited

U.S. PATENT DOCUMENTS

| | | | |
|---|---|---|---|
| 3,257,338 | 6/1966 | Sefton | 524/5 |
| 3,998,648 | 12/1976 | Thrower et al. | 501/127 |
| 4,082,563 | 4/1978 | Ellis et al. | 524/5 |
| 4,088,804 | 5/1978 | Cornwell et al. | 524/5 |
| 4,357,165 | 11/1982 | Helferich et al. | 106/38.3 |
| 4,402,752 | 9/1983 | Chesney | 106/93 |
| 4,430,439 | 2/1984 | Kleeb | 501/95 |

FOREIGN PATENT DOCUMENTS

| | | | |
|---|---|---|---|
| 0015135 | 9/1980 | European Pat. Off. | 524/5 |
| 0055035 | 6/1982 | European Pat. Off. | 524/5 |
| 2041906 | 9/1980 | United Kingdom | 524/5 |
| 2104837 | 3/1983 | United Kingdom . | |

OTHER PUBLICATIONS

Derwent, Abstract 44651k/19, (EP-78069), (May 1983) Veitscher Magnesitwerke.
Derwent, Abst. 34028e/17, (J57047757), Kuraraykk, (3-1982).

*Primary Examiner*—Herbert J. Lilling
*Attorney, Agent, or Firm*—Barry E. Deutsch

[57] ABSTRACT

Monolithic refractories containing refractory aggregate, cement and a hydrocolloid.

10 Claims, No Drawings

MONOLITHIC REFRACTORIES COMPRISING A HYDROCOLLOID

Monolithic or monolith forming refractories are special mixes or blends of dry granular or stiffly plastic refractory materials, with which virtually joint free linings are formed. They embrace a wide range of mineral compositions and vary greatly in their physical and chemical properties. In various types of furnaces, monolithic refractories are used to advantage over brick construction. By their use, fast installation can be made, avoiding delays for the manufacture of special brick shapes. They frequently eliminate difficult brick laying tasks which may be accompanied by weakness in construction. They are of major importance in the maintenance of furnaces. Substantial repairs can be made with a minimum loss of time and in some instances, even during operations.

Gunning mixes consist of granular refractory materials specifically prepared for application with air placement guns. Generally, there are two types of gun mixes based on their industrial uses; namely, those of high density and strength characterized by resistance to heat, chemical attack and mechanical abuse and those of lower density and strength designed primarily for insulating purposes. The mixes are sprayed from the guns or "gunned" at high velocity and pressure, forming homogeneous linings essentially free from lamination cracks.

Lightweight aggregate is a term used in the art to define low density materials that can be incorporated in brick or monolithic materials to impart low bulk density. The broad term lightweight aggregate includes a wide variety of materials, some refractory products, and others not refractory. The large majority of lightweight aggregates are of the non-refractory type and are used as ingredients in concrete block and concrete monolithic structures by the building industries. This invention, however, relates to the refractory lightweight aggregates used for the brick and monolithic linings of high-temperature furnaces.

The main object of the invention is to decrease the bulk density and increase the insulation value of monolithic refractories without lowering the melting point of the product.

Many high temperature process vessels have dense, refractory working linings which generally resist metal and slag attack or destruction by abrasion. High density is necessary to achieve these properties, but high density also contributes to great heat loss by thermal conductivity. To minimize heat loss, many working linings are backed up with a lightweight monolithic refractory which retards heat transfer through the entire lining. These products are generally cement-bonded lightweight aggregates, which include expanded shale, perlite, vermiculite and spherical, hollow alumina. Density of the lightweight monolith can be lowered by increasing the relative amount of lightweight aggregate in the mix, but since almost all these aggregates have low melting points, an increase in their concentration lowers the service temperature of the refractory product. The present invention makes it possible to lower the density of lightweight monolithic refractories without increasing the amount of lightweight aggregate.

In accordance with the present invention, there is provided a composition comprising a refractory aggregate, a cementatious material and a hydrocolloid addition to the refractory product.

Hydrocolloids are organic polymers, either in powder or fiber form, which are capable of absorbing fifty or more times their own weight in water. Their inclusion in lightweight refractory formulations allows the tempering water to be increased greatly without the refractory portion of the mix settling out. The hydrocolloid quickly absorbs water increasing in volume many times its original dimensions. It remains in this state while the cement surrounding the swollen hydrocolloid and the other refractory particles hardens during curing. When the refractory is dried, the water absorbed by the hydrocolloid is given off as a vapor, the hydrocolloid shrinks back to its original size and is eventually burned off in service leaving no ash. The dried refractory is essentially holes and possibly refractory or lightweight aggregate within a cement lattice. The holes provided by the use of hydrocolloids in the refractory do not contain any low melting compounds which would lower the refractoriness of the monolith.

Early attempts to reduce density, and thus reduce thermal conductivity, included the use of more lightweight aggregate or lighter lightweight aggregate than that already being used. Both of these solutions resulted in lower refractoriness since lightweight aggregates are not as refractory as fireclays. Additions of burnouts, such as sawdust and polystyrene beads, effectively lowered density, but required a relatively large amount of organic material to be volatilized when the lining was heated up. During heatup, the burnout tend to smoke and give off noxious vapors. The material which forms porosity in the disclosed invention is mostly absorbed water, which is released as harmless water vapor on drying. The portion of the pore former which must be burned out is the hydrocolloid, which is present in much smaller amounts than typical burnouts.

The present invention uses a hydrocolloid to hold the water into the tempered refractory mix. This does not act as a binder, but behaves similar to a gel in preventing the refractory and lightweight aggregate from settling out of the mix before it has set. In this system, a cement is used as the binder, which imparts adequate strength to the refractory article without firing.

The invention preferably involves the addition of 0.05% to 2.0% hydrocolloid to a refractory monolith composition, which reduces the density of the dried composition by greatly increasing the tempering water requirement. These hydrocolloids can be anionic polyacrylamides or polyacrylates. The invention is not limited to these compounds, however, since any organic polymer capable of absorbing many times its own weight of water will be operable.

The monolithic refractory composition to which the hydrocolloid is added, is preferably the following: 0 to 60%, by weight, dense refractory aggregate, such as flint clay, 15 to 40% crude kyanite; 0 to 15% lightweight refractory aggregate; 0 to 10% bond clay; and 15 to 70% cement, all on a weight basis.

A preferred composition would be: 10 to 45% dense refractory aggregate; 15 to 30% crude kyanite; 5 to 15% lightweight refractory aggregate; 1 to 3% bond clay; 18 to 30% cement; and 0.5 to 0.75% hydrocolloid, based on the total weight of the batch.

Lightweight aggregates have been evaluated in an attempt to lower the density and thermal conductivity of lightweight castables. Most of these materials have been rejected because of availability or performance. Other methods which can reduce density include increasing the water content or adding foaming or air entraining agents. These, too, can be impractical, since excess water can cause the aggregates to segregate and reduction of density due to the addition of foaming and air entraining agents is minimal.

The present tests utilize two synthetic polymer additions which would allow the tempering water of insulating castables to increase significantly without the aggregate settling out. Small amounts of each polymer can be mixed with relatively large amounts of water to form a gel-like substance. In a lightweight castable, this gel prevents the aggregates from settling out when excess tempering water is used. On drying and firing, the water is driven off and the polymer burned out, leaving the lightweight aggregate bonded and separated by a low density cement lattice.

Both polymers were evaluated as plus-additions to monolithic material. A series of mixes were made at water contents ranging from 18 to 24% (Mixes A through G). These mixes were judged to cover the consistency range of too dry to too wet. Mixes D, E and F, which contained 21 to 23% water, were judged to have typical casting consistencies. In Mixes H through Q, fibers or powder were added at levels ranging from 0.05% to 0.5%. These fibers have lengths of less than one millimeter and diameters of 10 to 40 microns, and become loosely matted during shipping. They were dispersed satisfactorily during mixing. At all levels, the polymer addition increased the ability of the mix to hold water. The amount of water which could be added before unsatisfactory watering out occurred increased with increasing polymer content. Mix Q, which contained 0.5% fiber, held water better than the fiber-free Mix F, which contained 12% less water. Mix Q had 11 pcf lower density than Mix F after heating to 1000° F. The mixes containing the polymer at all levels had satisfactory casting properties at some water content above the optimum for the standard. As expected, modulus of rupture and cold crushing strength dropped as density was decreased. Strengths could probably have been improved if the cement content was increased.

In Mixes R through U, a powdered polymer similar to the fiber was added to the mixes. As far as density, strength and casting properties are concerned, the mixes containing powdered polymer were similar to those containing equal amounts of fiber. The powder, however, would probably have a handling and mixing advantage in actual production.

The results of these tests are shown in Tables I and II below.

TABLE I

| Mix Designation: | A | B | C | D | E | F | G | H | I | J | K |
|---|---|---|---|---|---|---|---|---|---|---|---|
| Mix: | | | | | | | | | | | |
| Flint Clay | | | | | | 45% | | | | | |
| Crude Kyanite | | | | | | 30% | | | | | |
| Perlite | | | | | | 5% | | | | | |
| Ball Clay | | | | | | 2% | | | | | |
| Calcium Aluminate Cement | | | | | | 18% | | | | | |
| Plus Additions: | | | | | | | | | | | |
| Hydrocolloid Fibers | — | — | — | — | — | — | — | 0.3 | 0.2 | 0.05 | 0.2 |
| Water | 18 | 19 | 20 | 21 | 22 | 23 | 24 | 26.8 | 25.5 | 24.5 | 27 |
| Bulk Density, pcf (Av 3) | | | | | | | | | | | |
| After Drying at 250° F.: | 104 | 101 | 95 | 93 | 93 | 93 | 91 | 95 | 95 | 88 | 89 |
| After 1000° F. Reheat | 99 | 97 | 91 | 89 | 88 | 88 | 88 | 90 | 90 | 83 | 86 |
| Modulus of Rupture After 1000° F. Reheat, psi (Av 3): | 190 | 180 | 160 | 150 | 130 | 120 | 120 | 90 | 110 | 100 | 90 |
| Cold Crushing Strength After 1000° F. Reheat psi (Av 3): | 900 | 650 | 610 | 490 | 450 | 430 | 420 | 320 | 400 | 300 | 290 |

TABLE II

| Mix Designation: | L | M | N | O | P | Q | R | S | T | U |
|---|---|---|---|---|---|---|---|---|---|---|
| Mix: | | | | | | | | | | |
| Flint Clay | | | | | | 45% | | | | |
| Crude Kyanite | | | | | | 30% | | | | |
| Perlite | | | | | | 5% | | | | |
| Ball Clay | | | | | | 2% | | | | |
| Calcium Aluminate Cement | | | | | | 18% | | | | |
| Plus Additions: | | | | | | | | | | |
| Hydrocolloid Fibers | — | — | — | — | 0.3 | 0.5 | — | — | — | — |
| Hydrocolloid Powder | 0.2 | 0.2 | 0.3 | 0.3 | — | — | 0.2 | 0.2 | 0.2 | 0.2 |
| Water | 29 | 30 | 30 | 32.5 | 35 | 35 | 25.5 | 27 | 29 | 31 |
| Bulk Density, pcf (Av 3) | | | | | | | | | | |
| After Drying at 250° F.: | 86 | 84 | 84 | 81 | 81 | 81 | 92 | 90 | 88 | 83 |
| After 1000° F. Reheat | 82 | 81 | 81 | 78 | 77 | 77 | 88 | 86 | 83 | 79 |
| Modulus of Rupture After 1000° F. Reheat, psi (Av 3): | 70 | 70 | 60 | 50 | 50 | 30 | 110 | 110 | 70 | 60 |
| Cold Crushing Strength After 1000° F. Reheat psi (Av 3): | 220 | 210 | 190 | 100 | 120 | 100 | 370 | 370 | 240 | 190 |

Additional tests were conducted involving the polymers.

The main purpose was to study slightly higher polymer additions, evaluate higher cement contents in the base mix and compare the thermal conductivity of polymer-containing mixes to regular castables without the polymer addition.

In this Example, only the powder was evaluated. A standard castable (Mix A) was made for comparison to the test mixes. Mixes B, C and D all contained 0.5% powder and were tempered with 35% water, but their cement contents were 18%, 25% and 30%, respectively. The increased cement was added at the expense of the calcined clay. In these mixes, strengths increased with increasing cement content, while density after reheat remained essentially unchanged.

In Mixes E and F, 0.75% powder and 40% water were used. These mixes were about 20 pcf less dense than the standard and were not as strong, but as cement content increased, strengths did also. The K values for Mix F, which contained 30% cement, were about 35% below those of the standard.

Although Mixes G, H and I were made only to establish raw material ranges, Mix G showed the value of the polymer as a replacement for lightweight aggregate. This mix contained 30% kyanite, 70% cement and 2% powder. The cement hardened around the water-swollen polymer, leaving holes within a cement lattice after drying. Mix G was 16 pcf less dense than the standard and about twice as strong.

See Table III below for test results.

TABLE III

| Mix Designation: | A | B | C | D | E | F | G | H | I |
|---|---|---|---|---|---|---|---|---|---|
| Mix: | | | | | | | | | |
| Flint Clay | 45% | 45% | 38% | 33% | 38% | 33% | — | 10% | 60% |
| Crude Kyanite | 30 | 30 | 30 | 30 | 30 | 30 | 30% | 40 | 15 |
| Perlite | 5 | 5 | 5 | 5 | 5 | 5 | — | 15 | 5 |
| Ball Clay | 2 | 2 | 2 | 2 | 2 | 2 | — | 10 | 2 |
| Calcium Aluminate Cement | 18 | 18 | 25 | 30 | 25 | 30 | 70 | 25 | 18 |
| Plus Additions: | | | | | | | | | |
| Hydrocolloid powder | — | 0.5 | 0.5 | 0.5 | 0.75 | 0.75 | 2.0 | 0.5 | 0.5 |
| Water | 23 | 35 | 35 | 35 | 40 | 40 | 40 | 43 | 35 |
| Bulk Density, pcf (Av 3) | | | | | | | | | |
| After Drying at 250° F.: | 98 | 84 | 85 | 88 | 81 | 82 | 92 | 66 | 77 |
| After 1000° F. Reheat | 95 | 82 | 80 | 81 | 76 | 75 | 79 | 60 | 72 |
| Modulus of Rupture, psi (Av 3) After Drying at 250° F.: | 260 | 150 | 300 | 380 | 240 | 330 | 460 | 180 | 80 |
| After 1000° F. Reheat: | 140 | 60 | 110 | 140 | 70 | 100 | 130 | 30 | 80 |
| Cold Crushing Strength, psi (Av 3) After Drying at 250° F.: | 920 | 410 | 750 | 1030 | 490 | 660 | 1770 | 390 | 140 |
| After 1000° F. Reheat: | 485 | 160 | 355 | 490 | 205 | 300 | 940 | 60 | 250 |

In following Table IV, tests were conducted utilizing the present invention in gunning mixes. The results are shown in Table IV below.

TABLE IV

| Mix Designation | | | |
|---|---|---|---|
| Mix: | | | |
| Flint clay | 67% | 67% | 62% |
| Perlite | 7 | 7 | 7 |
| Ball clay | 6 | 6 | 6 |
| Calcium Aluminate Cement | 20 | 20 | 25 |
| Plus Additions: | | | |
| Hydrocolloid fiber | — | 0.5 | 0.5 |
| Predampening Water, % | 8.0 | 8.0 | 8.0 |
| Rebounds, % | 17.0 | 8.2 | 10.1 |
| Bulk density, pcf After Drying at 250° F. | 106 | 89 | 98 |

Mix A is a standard mix without the addition of the fiber. Mixes B and C contain the fiber and indicate that the fiber is effective in reducing the rebounds and lowering the density which would lower thermal conductivity.

It is intended that the foregoing description be construed as illustrative and not in limitation of the invention.

Having thus described the invention in detail and with sufficient particularity as to enable those skilled in the art to practice it, what is desired to have protected by Letters Patent is set forth in the following claims.

The embodiments of the invention in which an exclusive property or privilege is claimed are defined as follows:

1. Refractory monolithic batch consisting essentially of at least one refractory aggregate, a cementatious material and about 0.05 to 2.0% of a hydrocolloid based on the total weight of the batch, said hydrocolloid comprising an organic polymer capable of absorbing substantially at least 50 times its weight in water to form a substantially porous thermally insulating refractory product when the batch is dried.

2. The batch of claim 1 in which the batch comprises from about 0.5 to 0.75% of a hydrocolloid based on the total weight of the batch.

3. The batch of claim 1 in which the hydrocolloid is at least one material selected from the group consisting of anionic polyacrylamides and polyacrylates.

4. Monolith of claim 1 in which the batch comprises, by weight, about 0 to 60% dense refractory aggregate, about 15 to 40% crude kyanite, about 0 to 15% lightweight refractory aggregate, about 0 to 10% bond clay and about 15 to 70% cement.

5. Monolith of claim 1 in which the batch comprises, by weight, about 10 to 45% dense refractory aggregate, about 15 to 30% crude kyanite, about 5 to 15% lightweight refractory aggregate, about 1 to 3% bond clay and about 18 to 30% cement.

6. Monolith of claim 5 in which the dense refractory aggregate is flint clay.

7. Monolith of claim 5 in which the lightweight refractory aggregate is Perlite.

8. Monolith of claim 5 in which the bond clay is ball clay.

9. Monolith of claim 4 in which the cement is calcium aluminate cement.

10. Batch of claim 1 in which the hydrocolloid is either a fiber or a powder.

* * * * *